United States Patent
Jeong

(10) Patent No.: US 11,566,612 B2
(45) Date of Patent: Jan. 31, 2023

(54) LINEAR COMPRESSOR

(71) Applicant: LG Electronics Inc., Seoul (KR)

(72) Inventor: Sangsub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 16/127,826

(22) Filed: Sep. 11, 2018

(65) Prior Publication Data

US 2019/0078563 A1 Mar. 14, 2019

(30) Foreign Application Priority Data

Sep. 11, 2017 (KR) .................. 10-2017-0116044

(51) Int. Cl.
| | | |
|---|---|---|
| F04B 35/04 | (2006.01) | |
| H02K 33/16 | (2006.01) | |
| F04B 39/00 | (2006.01) | |
| F04B 39/06 | (2006.01) | |
| H02K 1/12 | (2006.01) | |

(52) U.S. Cl.
CPC ........ *F04B 35/045* (2013.01); *F04B 39/0005* (2013.01); *F04B 39/06* (2013.01); *H02K 33/16* (2013.01); *H02K 1/12* (2013.01); *H02K 2213/03* (2013.01)

(58) Field of Classification Search
CPC .... F04B 35/045; F04B 39/06; F04B 39/0005; H02K 33/16; H02K 1/12; H02K 2213/03
See application file for complete search history.

(56) References Cited

U.S. PATENT DOCUMENTS

| | | | | |
|---|---|---|---|---|
| 2003/0173836 A1* | 9/2003 | Inagaki | .................. | H02K 33/16 310/14 |
| 2006/0222532 A1* | 10/2006 | Lee | ........................ | H02K 33/16 417/417 |
| 2013/0129540 A1* | 5/2013 | Song | ...................... | H02K 33/16 417/415 |
| 2017/0370354 A1* | 12/2017 | Jeong | ...................... | F04B 39/10 |
| 2018/0195504 A1* | 7/2018 | Lee | ........................ | F04B 39/121 |
| 2018/0198358 A1* | 7/2018 | Jeong | ...................... | H02K 1/34 |
| 2018/0258921 A1* | 9/2018 | Hong | ..................... | H02K 33/16 |

FOREIGN PATENT DOCUMENTS

KR 1020160132665 11/2016

* cited by examiner

*Primary Examiner* — Charles G Freay
*Assistant Examiner* — Lilya Pekarskaya
(74) *Attorney, Agent, or Firm* — Fish & Richardson P.C.

(57) ABSTRACT

A linear compressor includes a casing, a cylinder forming a compression chamber inside the casing, a piston reciprocating to compress a fluid of the compression chamber, a mover having a movable magnet and reciprocating on the basis of a predetermined reference position to drive the piston, and a stator generating a thrust pushing the mover in the reciprocating direction and a restoring force pushing the mover in a direction toward the reference position according to an interaction with the movable magnet, wherein the stator includes a mover air gap formed to accommodate the mover and a magnetoresistive air gap formed in a position spaced apart from the mover air gap to change magnetic resistance of a magnetic circuit formed along the stator. According to this, a magnetic resonance spring with increased restoring force may be implemented.

12 Claims, 10 Drawing Sheets

LINEAR COMPRESSOR

CROSS-REFERENCE TO RELATED APPLICATION

Pursuant to 35 U.S.C. § 119(a), this application claims the benefit of earlier filing date and right of priority to Korean Application No. 10-2017-0116044, filed on Sep. 11, 2017, the contents of which is incorporated by reference herein in its entirety.

FIELD

The present disclosure relates to a linear compressor for compressing a fluid by a linear reciprocating motion of a vibrating body.

BACKGROUND

Generally, compressors are devices which compress a working fluid such as air, a refrigerant, or the like, upon receiving power from a power generating device such as a motor, a turbine, or the like. Compressors are commonly applied to industrial and household appliances, in particular, steam compression chamber refrigerating cycles (hereinafter referred to as a 'refrigerating cycle').

Compressors include a reciprocating compressor in which a compression chamber is formed between a piston and a cylinder and the piston reciprocates linearly to compress a fluid, a rotary compressor that compresses a fluid by a roller which rotates eccentrically in a cylinder, and a scroll compressor in which a pair of scrolls are engaged to rotate to compress a fluid.

Recently, among reciprocating compressors, linear compressors which employ a linear motor that reciprocates linearly without using a crank shaft have been developed. The linear compressors does not have mechanical loss in changing a rotational motion into a linear reciprocal motion, obtaining enhanced efficiency, and have a simple structure.

In such a linear compressor, a cylinder is positioned inside a casing forming a closed space to form a compression chamber, and a piston covering the compression chamber reciprocates in the cylinder. That is, as the piston moves to be positioned at a bottom dead center (BDC), a fluid in the closed space is sucked into the compression chamber (suction stroke), and as the piston moves to be positioned at a top dead center (TDC), the fluid in the compression chamber is compressed and discharged (compression stroke), and this process is repeated.

In order to efficiently realize the reciprocating motion of the piston, a resonance spring is mounted on the linear compressor. As the resonance spring, a coil spring is largely used, which has a predetermined spring constant and is resonated with the reciprocating motion of the piston to act to amplify the reciprocating motion of the piston.

However, since the mechanical resonance spring such as a coil spring is a component added to the linear compressor, unlike other types of compressors driven by a rotational motion, research has been conducted to remove or replace the resonance spring.

For example, Patent document 1 (Korean Patent Laid-Open Publication No. 10-2016-0132665, published on Nov. 21, 2016) proposes a magnetic resonance spring configuration which employs a mover having two or three magnets to generate a restoring force pushing a vibrating body in a central direction of vibration, in addition to a thrust for a driving unit to push the vibrating body in a direction in which the vibrating body is driven.

However, Patent document 1 does not propose a structure for regulating linearity or an inflection point of a restoring force profile, a variation width of a thrust constant, i.e., a ratio of a thrust and an applied current, and the like. Thus, it is required to derive a structure capable of easily changing the characteristics of a magnetic resonance spring based on the restoring force, the thrust constant, and the like. In addition, by optimizing the characteristics of the magnetic resonance spring, a magnetic resonance spring structure capable of completely replacing the mechanical resonance spring may be derived.

SUMMARY

Therefore, a first aspect of the detailed description is to provide a linear compressor having a structure capable of easily setting the magnetic resistance of a magnetic circuit formed along a stator.

A second aspect of the detailed description is to provide a linear compressor having a structure capable of maximizing stroke of a piston with respect to a size of a magnet acting as a magnetic resonance spring.

A third aspect of the detailed description is to provide a linear compressor having a structure capable of setting and improving characteristics, such as stiffness, offset, and the like, of a magnetic resonance spring.

To achieve these and other advantages and in accordance with the purpose of this specification, as embodied and broadly described herein, a linear compressor includes: a casing; a cylinder forming a compression chamber inside the casing; a piston reciprocating to compress a fluid of the compression chamber; a mover having a movable magnet and reciprocating on the basis of a predetermined reference position to drive the piston; and a stator generating a thrust pushing the mover in the reciprocating direction and a restoring force pushing the mover in a direction toward the reference position according to an interaction with the movable magnet, wherein the stator includes a mover air gap formed to accommodate the mover and a magnetoresistive air gap formed in a position spaced apart from the mover air gap to change magnetic resistance of a magnetic circuit formed along the stator.

To achieve these and other advantages and in accordance with the purpose of this specification, as embodied and broadly described herein, a linear compressor includes: a casing; a cylinder forming a compression chamber inside the casing; a piston reciprocating to compress a fluid of the compression chamber; a mover having a movable magnet and reciprocating on the basis of a predetermined reference position to drive the piston; and a stator generating a thrust pushing the mover in the reciprocating direction and a restoring force pushing the mover in a direction toward the reference position according to an interaction with the movable magnet, wherein the movable magnet includes a first magnet having an N pole and an S pole; and a second magnet having an N pole and an S pole positioned opposite to the N pole and the S pole of the first magnet and spaced apart from the first magnet.

To achieve these and other advantages and in accordance with the purpose of this specification, as embodied and broadly described herein, the stator of the linear compressor may include: an inner stator surrounding the cylinder; and an outer stator disposed to surround the inner stator and accommodating a winding coil extending in a circumferential direction of the cylinder, wherein the inner stator has a recess portion formed to be recessed from a surface facing the winding coil.

The present disclosure described above has the following effects.

First, in the linear compressor of the present disclosure, since the magnetoresistive air gap is formed in the stator, magnetic resistance of the magnetic circuit formed along the stator may be changed. Since a thrust constant of the linear motor is changed and stiffness of the magnetic resonance spring may be adjusted in accordance with the change in the magnetic resistance, a design in which the mechanical resonance spring is replaced with a magnetic resonance spring is possible. Thus, the weight of the linear compressor and manufacturing cost may be reduced. Also, since stiffness of the spring is increased to be suitable for high-speed operation according to the design of the magnetoresistive air gap, it is more effective as compared with the case where the mass in which the mechanical resonance spring vibrates when stiffness is increased is increased together.

Second, in the linear compressor of the present disclosure, since the first and second magnets of the movable magnet are arranged to be spaced apart from each other in the reciprocating motion direction of the piston, the stroke may be increased as compared with the same magnet size. In addition, an inflection of the restoring force is clearly formed, and thus, the design and control of the magnetic resonance spring may be facilitated.

Third, according to the linear compressor of the present disclosure, stiffness and an offset value of the magnetic resonance spring may be changed by the design in which the inner stator includes the recess portion, and the design in which the restoring force characteristic is improved may be derived. Therefore, the stiffness of the magnetic resonance spring may be a design factor that may be precisely controlled.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a linear compressor according to the present disclosure will be described in detail with reference to the accompanying drawings.

Like numbers refer to like elements throughout although the embodiments are different, and a redundant description thereof will be omitted.

In describing the present disclosure, if a detailed explanation for a related known function or construction is considered to unnecessarily divert the gist of the present disclosure, such explanation has been omitted but would be understood by those skilled in the art.

The accompanying drawings of the present disclosure aim to facilitate understanding of the present disclosure and should not be construed as limited to the accompanying drawings. Also, the present disclosure is not limited to a specific disclosed form, but includes all modifications, equivalents, and substitutions without departing from the scope and spirit of the present disclosure.

As used herein, the singular forms "a", "an" and "the" are intended to include the plural forms as well, unless the context clearly indicates otherwise.

The linear compressor according to the present disclosure performs an operation of sucking and compressing a fluid and discharging a compressed fluid. The linear compressor according to the present disclosure may be a component of a refrigerating cycle. Hereinafter, as a fluid, a refrigerant circulating in the refrigerating cycle will be described as an example.

Figure 1:
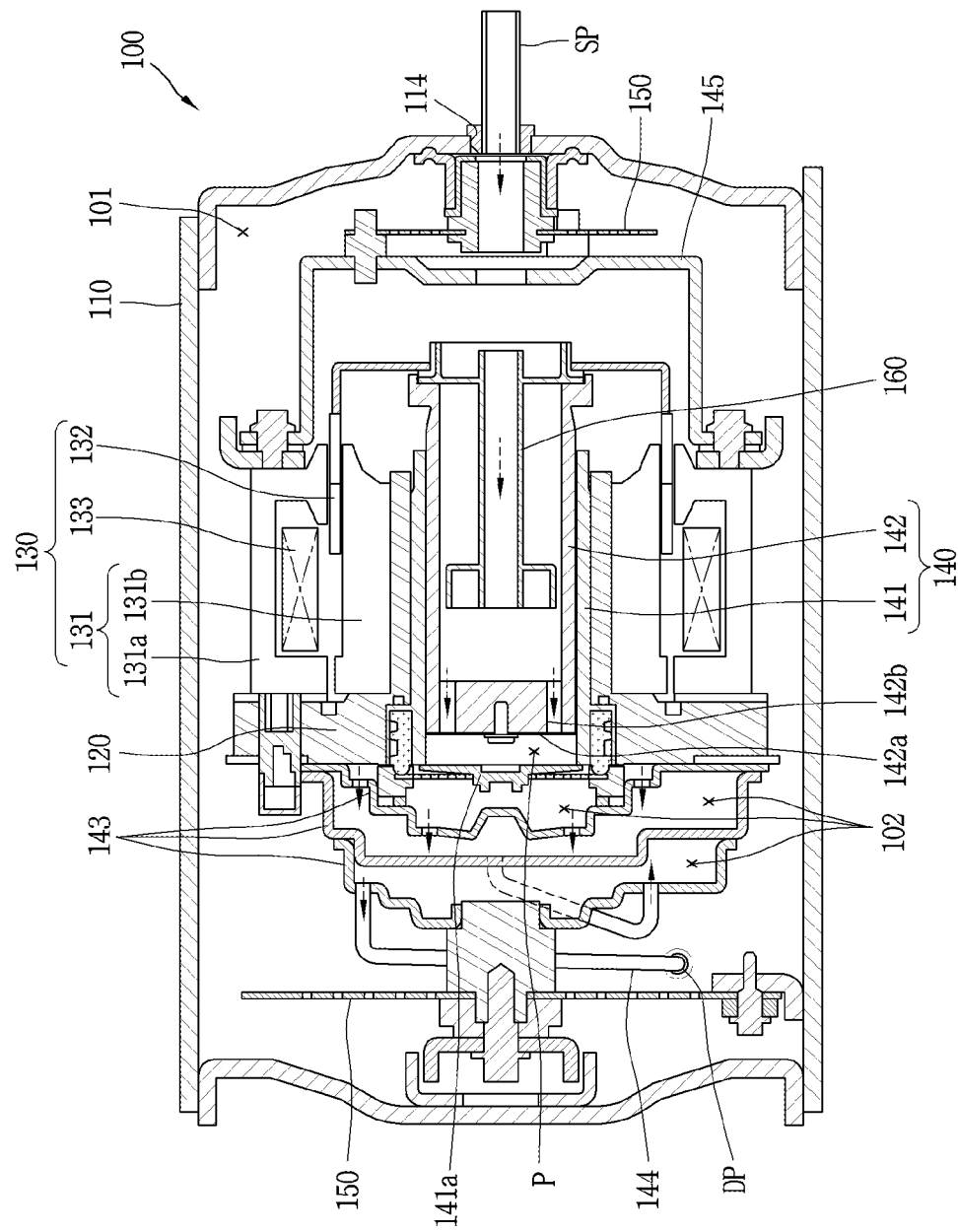
FIG. 1 is a cross-sectional view illustrating a linear compressor according to an embodiment of the present disclosure.

FIG. 1 is a longitudinal cross-sectional view of a linear compressor 100 according to an embodiment of the present disclosure. Referring to FIG. 1, the linear compressor 100 of the present disclosure includes a casing 110, a driving unit 130, and a compression unit 140.

The casing 110 may form a closed space. The closed space may be a suction space 101 filled with a refrigerant sucked for compression. In order to suck the refrigerant into the suction space 101, a suction port 114 may be formed in the casing 110 and a suction pipe SP may be mounted. The casing 110 may have a discharge port 115 through which the refrigerant may be discharged from the discharge space 102 (to be described later) to the outside, and a discharge pipe DP may be connected thereto.

In addition, a frame 120 for supporting the driving unit 130 and the compression unit 140 may be formed in the casing 110. The frame 120 may be connected to and supported by the other end of a support spring 150 which is positioned such that one end thereof is fixed to the casing 110. The frame 120 may include a front frame and a rear frame respectively coupled to both ends of a stator 131 to be described later. The support spring 150 may be a leaf spring as illustrated or may be a coil spring.

The driving unit 130 may serve to generate a reciprocating motion of the linear compressor 100 according to the present disclosure. To this end, the driving unit 130 may include the stator 131 and a mover 132. The stator 131 may be coupled to the frame 120. The stator 131 may include an outer stator 131a and an inner stator 131b. The mover 132 may be positioned between the outer stator 131a and the inner stator 131b.

A winding coil 133 may be mounted on the outer stator 131a, and the mover 132 may have a magnet. Thus, when a current is applied to the winding coil 133 of the driving unit 130, a magnetic flux may be formed in the stator 131. Also, a force capable of moving the mover 132 may be generated by an interaction between the magnetic flux formed by the applied current and the magnetic flux formed by the magnet of the mover 132. In particular, the driving unit 130 of the linear compressor 100 according to the present disclosure may perform the function of a magnetic resonance spring replacing a mechanical resonance spring, which will be described later.

Meanwhile, the compression unit 140 sucks the refrigerant from the suction space 101 and compresses and discharges the refrigerant. The compression unit 140 may be located at the center of the casing 110 on an inner side of the inner stator 131b and includes the cylinder 141 and the piston 142. The cylinder 141 may be supported by the frame 120 and may form a compression chamber P therein.

The cylinder 141 may have a cylindrical shape to receive the refrigerant and the piston 142 therein and may be formed so that both ends thereof are open. One end of the cylinder 141 may be closed by a discharge valve 141a and a discharge cover 143 may be mounted on an outer side of the discharge valve 141a.

A discharge space 102 may be formed between the discharge valve 141a and the discharge cover 143. That is, the compression chamber P and the discharge cover 143 may form a separated space by the discharge valve 141a. In addition, a discharge tube 144 extending allow the discharge port 115 and the discharge space 102 to communicate with each other may be provided in the casing 110.

The piston 142 may be inserted into the other open end of the cylinder 141 to hermetically close the compression chamber P. The piston 142 is configured to be coupled to the previously described mover 132 and may reciprocate together with the mover 132. The inner stator 131b and the cylinder 141 may be positioned between the mover 132 and the piston 142. Thus, the mover 132 and the piston 142 may be coupled to each other by a separate connecting frame 145 formed to bypass the cylinder 141 and the inner stator 131b.

Meanwhile, the internal space of the piston 142 and the compression chamber P may communicate with each other by the suction port 142b. That is, when the refrigerant flowing to an internal space of the piston 142 from the suction space 101 flows through the suction port 142b and the suction valve 142a covering the suction port 142b is opened by pressure of the refrigerant, the refrigerant may be sucked into the compression chamber P. A muffler 160 may be mounted in the internal space of the piston 142 to reduce vibration and noise caused due to driving of the compressor.

The linear compressor 100 described above operates as follows.

First, when a current is applied to the driving unit 130, a magnetic flux may be formed in the stator 131. The mover 132 having the magnets may be linearly reciprocated by an electromagnetic force generated by the magnetic flux formed in the stator 131.

During reciprocation of the mover 132, the piston 142 connected to the mover 132 may reciprocate together. The piston 142 reciprocating within the cylinder 141 repeats a motion of increasing and decreasing the volume of the compression chamber P.

When the piston 142 is moved, while increasing the volume of the compression chamber P, pressure inside the compression chamber P decreases. Accordingly, the suction valve 141b formed in the cylinder 141 is opened and the refrigerant staying in the suction space 101 may be sucked into the compression chamber P. This suction stroke is performed until the piston 142 reaches the bottom dead center (BDC) by maximizing the volume of the compression chamber P. Here, the refrigerant staying in the suction space 101 may be sucked into the compression chamber P through the muffler 160 formed to reduce vibration and noise of the compressor.

The piston 142, which has reached the bottom dead center, performs the compression stroke, while reducing the volume of the compression chamber P. The compression stroke is performed while the piston 142 is moved to reach a top dead center (TDC) at which the volume of the compression chamber P is minimized. During the compression stroke, pressure inside the compression chamber P is increased to compress the sucked refrigerant. When the pressure in the compression chamber P reaches a predetermined pressure, the discharge valve 141a mounted on the cylinder 141 is opened and the refrigerant is discharged to the discharge space 102.

As the suction and compression stroke of the piston 142 is repeated, the refrigerant of the suction space 101 introduced into the suction pipe SP is sucked into the compression chamber P and compressed and discharged to the outside of the compressor through the discharge space 102, the discharge tube 144, and the discharge pipe DP, forming a refrigerant flow.

Meanwhile, the linear compressor 100 according to an embodiment of the present disclosure may be an oil-less type in which oil is not separately used to lubricate and cool a frictional surface formed between a fixing body including the cylinder 141 and the stator 131 and the vibrating body including the mover 132 and the piston 142. The oil-less type linear compressor 100 may include a gas bearing formed to lubricate and cool a frictional surface between the cylinder 141 and the piston 142. For example, a portion of the refrigerant from the discharge space 102 may be supplied to an outer circumferential surface of the piston 142 by a bearing passage (not shown) formed in the cylinder 141 to form a gas bearing film.

In the foregoing, the schematic structure and operation of the linear compressor 100 according to the present disclosure have been described. Hereinafter, the driving unit 130 serving as a magnetic resonance spring according to an embodiment of the present disclosure will be described in detail.

Figure 2:
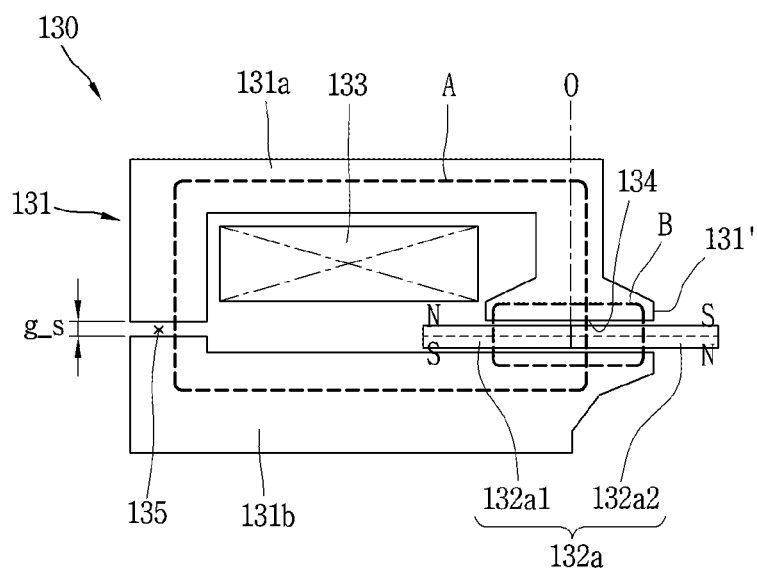
FIG. 2 is a conceptual view illustrating magnetic fluxes formed to generate a thrust and a restoring force in the driving unit illustrated in FIG. 1.

FIG. 2 is a conceptual view illustrating magnetic fluxes formed to generate a thrust and a restoring force in the driving unit 130 illustrated in FIG. 1. Referring to FIGS. 1 and 2, the inner stator 131b constituting the stator 131 may be mounted on the outer circumferential surface of the cylinder 141 to surround the cylinder 141 in a circumferential direction, and the outer stator 131a may be disposed to surround the inner stator 131b in the circumferential direction.

The outer stator 131a and the inner stator 131b may be spaced from each other to form an air gap which is a space in which the mover 132 reciprocates. The stator 131 of this embodiment may have one mover air gap.

The mover 132 may be positioned to reciprocate within the mover air gap 134. The mover 132 may be fixed to the piston 142 by the connecting frame 145 as described above. The mover 132 may be provided with a movable magnet 132a to realize a reciprocating motion of the cylinder 141 in an axial direction. In this embodiment, the mover 132 reciprocates in one mover air gap 134, and the movable magnet 132a may be configured to include first and second magnets 132a1 and 132a2.

Specifically, the first and second magnets 132a1 and 132a2 formed of permanent magnets may be arranged in parallel to the axial direction of the cylinder 141 in which the piston 142 reciprocates. The first and second magnets 132a1 and 132a2 may each have the N pole and the S pole. However, the first magnet 132a1 and the second magnet 132a2 may be arranged such that the N poles and the S poles are positioned in the opposite directions. As illustrated, the first and second magnets 132a1 and 132a2 are arranged such that the N poles and S poles are positioned in the radial direction of the cylinder 141, and the side in which the first magnet 132a1 faces the inner stator 131b and the side in which the second magnet 132a2 faces the outer stator 131a have the same pole.

Furthermore, the mover 132 may reciprocate about a predetermined reference position O. The predetermined reference position O may be, for example, a middle point between the top dead center and the bottom dead center. However, in consideration of the fact that the mover 132 is pushed by pressure of the refrigerant increased in the compression chamber P, the predetermined reference position may be set to have a predetermined offset toward the top dead center side.

The stator 131 and the mover 132 according to the present disclosure are formed to provide a thrust force and a restoring force for a reciprocating motion of the piston 142. Here, the thrust refers to a force pushing the mover 132 in a direction of a motion, specifically, which acts toward the top dead center during the compression stroke and toward the bottom dead center during the suction stroke. Meanwhile, the restoring force refers to a force pushing the mover 132 toward the reference position O. That is, the restoring force may be zero at the reference position O, and may be increased or decreased toward the top dead center or bottom dead center from the reference position O.

As illustrated in FIG. 2, two kinds of magnetic fluxes may be formed in the stator 131 and the mover 132 of the present disclosure. One is a magnetic flux A that forms a magnetic path interlinking the winding coil 133 and may serve to generate the above-described thrust. That is, one loop may be formed along the inner and outer stators 131b and 131a by a current applied to the winding coil 133, which may generate a thrust force for the compression and suction strokes of the mover 132.

The other magnetic flux B is formed to circle over the movable magnet 132a of the present disclosure, i.e., the first and second magnets 132a1 and 132a2, and may operate to generate a restoring force in the present disclosure. The amount of magnetic flux circling over the movable magnet 132a exposed to a side surface 131' of a pole portion of the stator 131 forming the mover air gap 134 may increase as the mover 132 deviates from the reference position O. Therefore, the restoring force formed by the magnetic flux that circles over the movable magnet 132a tends to increase in absolute value as it is away from the reference position O.

Figure 3A:
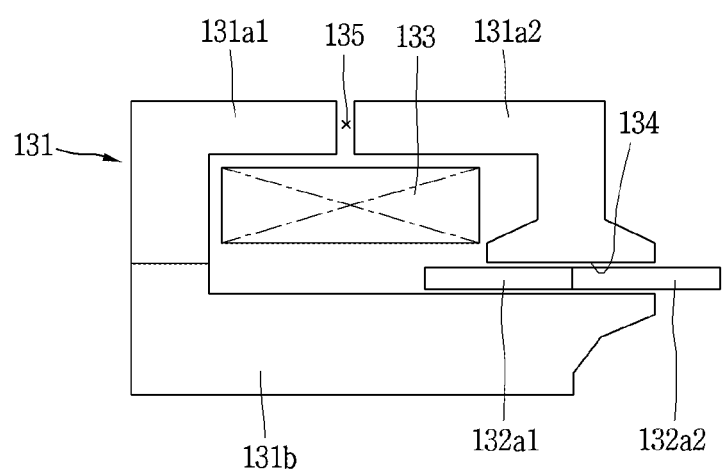
FIGS. 3A to 3D are conceptual views illustrating various examples of magnetoresistive air gaps formed in a stator illustrated in FIG. 1.
Figure 3B:
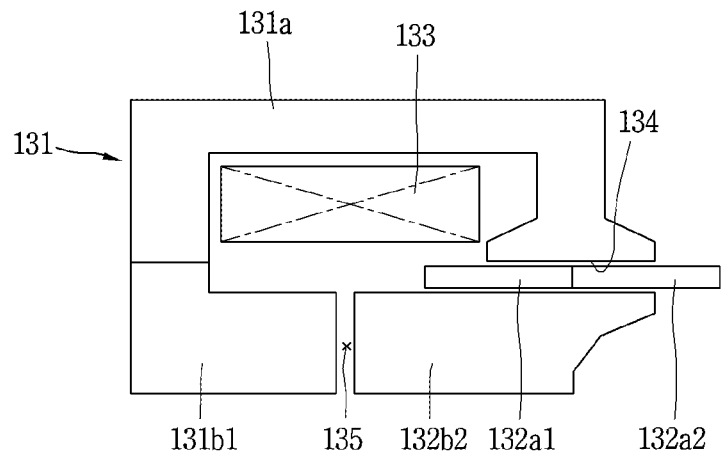
Figure 3C:
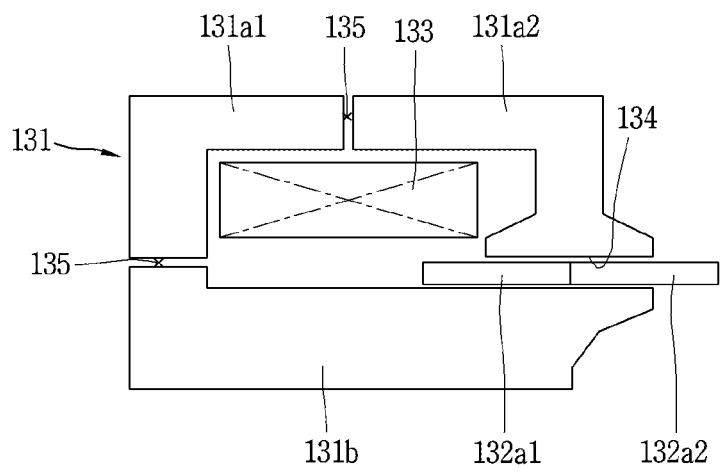

FIGS. 3A to 3C, together with FIG. 2, illustrate various examples of a magnetoresistive air gap 135 formed in the stator 131 illustrated in FIG. In the linear compressor 100 according to an embodiment of the present disclosure, the stator 131 may further include the magnetoresistive air gap 135 in addition to the mover air gap 134.

The magnetoresistive air gap 135 serves to change magnetic resistance of a magnetic path interlinking the winding coil 133. The magnetoresistive air gap 135, separate from the mover air gap 134 described above, may be formed at a position apart from the mover air gap 134.

Referring to FIG. 2, the magnetoresistive air gap 135 may be formed as the inner stator 131b and the outer stator 131a are spaced apart from each other in a facing manner. That is, a magnetoresistive air gap 135 may be formed on one side and the mover air gap 134 may be formed on the other side, with respect to the winding coils 133 housed in the outer stator 131a. Here, the magnetoresistive air gap 135 is not necessarily set to have a width equal to that of the mover air gap 134 but may be designed to have a separate width $g\_s$ in consideration of a magnitude of the magnetic resistance to be formed.

Alternatively, as illustrated in FIGS. 3A and 3B, the magnetoresistive air gap 135 may be formed in the outer stator 131a or the inner stator 131b. That is, at least one of the outer and inner stators 131a and 131b may include a plurality of stator cores 131a1, 131a2, 131b1, and 131b2 disposed to be spaced apart from each other. A gap between the plurality of stator cores 131a1, 131a2, 131b1, and 131b2 that are spaced apart from each other may be the magnetoresistive air gap 135. A direction in which the magnetoresistive air gap 135 is formed may be the radial direction of the cylinder, as illustrated in FIGS. 3A and 3B.

However, the plurality of stator cores 131a1, 131a2, 131b1, and 131b2 may be spaced apart from each other in the radial direction of the cylinder to form a magnetoresistive air gap 135 that is open in a direction parallel to the mover air gap 134. Further, as illustrated in FIG. 3C, a plurality of magnetoresistive air gaps 135 may be formed in the form of a combination of the above examples.

Figure 3D:
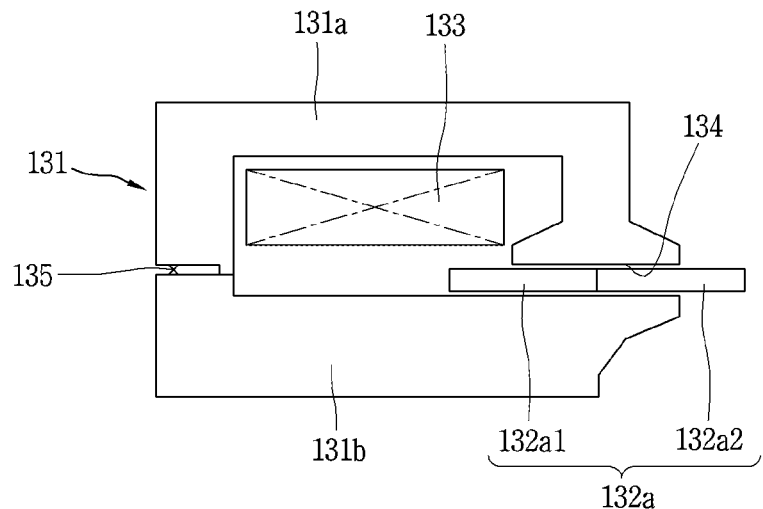

As illustrated in FIG. 3D, the magnetoresistive air gap 135 may also be formed as a portion of the outer stator 131a and a portion of the inner stator 131b are spaced apart from each other. That is, the inner and outer stators 131a and 131b may have a surface protruding stepwise toward the other so that partial end surfaces may be coupled to each other. Such a magnetoresistive air gap 135 may act as magnetic resistance as the cross-sectional area of the stator 131 on the path through which the magnetic flux passes is reduced.

By the arrangement of the magnetoresistive air gaps 135 as in the examples illustrated in FIGS. 2 and 3A to 3D, magnetic resistance of a magnetic path linking the coil may be set to a desired value. In addition, the magnitude of magnetic resistance may differ as the g_s of the magnetoresistive air gap 135 is set to be different.

Figure 4:
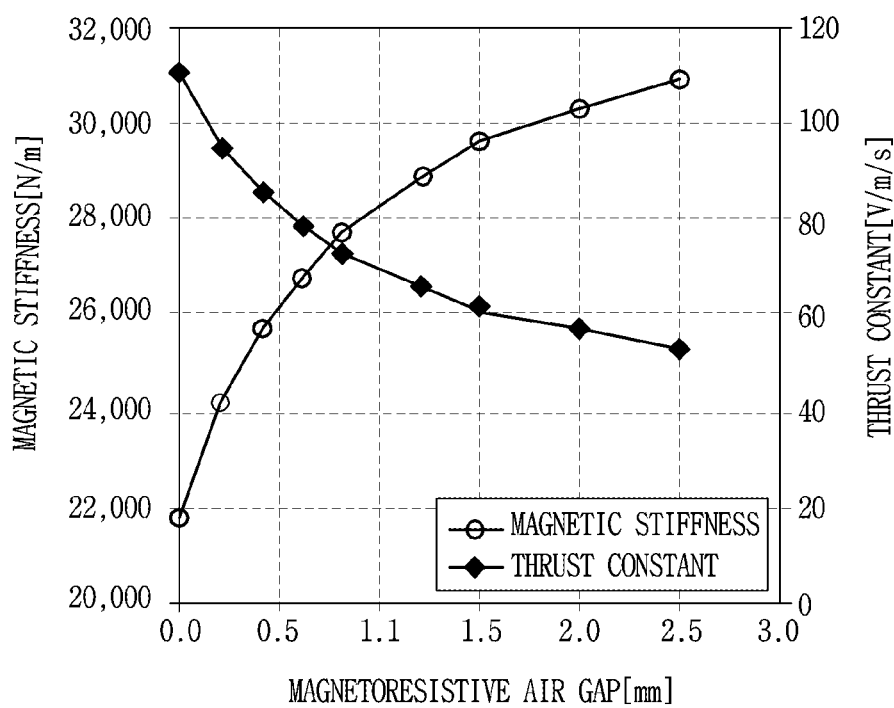
FIG. 4 is a graph illustrating changes in magnetic stiffness and thrust constant according to a magnetoresistive air gap illustrated in FIG. 2.

As a result of changing the magnetic resistance by the magnetoresistive air gap 135, the characteristics of the magnetic resonance spring of the linear compressor 100 of the present disclosure may be changed. FIG. 4 is a graph illustrating changes in magnetic stiffness (or stiffness) and thrust constant according to the magnetoresistive air gap 135 illustrated in FIG. 2.

The value of the magnetoresistive air gap 135 in FIG. 4 corresponds to the distance g_s over which the inner stator 131b and the outer stator 131a are spaced from each other in the axial direction of the cylinder 141 in FIG. 2. The thrust constant (also referred to as an 'induced voltage constant' or 'α (alpha)') refers to the ratio of a generated thrust to a current applied to the winding coil 133, which may have a unit of [N/Amp.] or [N-s/m]. In addition, the magnetic stiffness refers to the stiffness [N/m] of the magnetic resonance spring formed by a restoring force.

Referring to the results of FIG. 4, it may be seen that the thrust constant decreases as the magnetoresistive air gap 135 increases. That is, the magnetoresistive air gap 135 acts as resistance to the magnetic flux A interlinking the coil, and as the resistance increases, the thrust as a driving force of a reciprocating motion of the piston 142 tends to decrease. However, it may be seen that the magnetic stiffness generated by the magnetic flux B (i.e., the magnetic flux which circles over the first and second magnets 132a1 and 132a2) forming the restoring force tends to increase.

As the magnetoresistive air gap 135 is provided in the stator 131 of the linear compressor 100 of the present disclosure, magnetic resistance of the magnetic circuit formed along the stator 131 may be changed. Also, according to the change in the magnetic resistance, the thrust constant of the linear motor may be changed and the stiffness of the magnetic resonance spring may be adjusted.

Specifically, depending on the setting of the magnetoresistive air gap 135, a magnetic resonance spring suitable for operating conditions of the linear compressor 100 of the present disclosure may be designed. For example, a condition of small magnetic stiffness and large thrust constant is advantageous for a low-speed operation of the compressor, and a condition of large magnetic stiffness and small thrust constant is advantageous as the compressor is operated at a high speed. In particular, a design replacing the related art mechanical resonance spring may be derived by providing the magnetoresistive air gap 135 to increase magnetic stiffness.

According to the present disclosure, when the related art mechanical resonance spring is removed, the weight of the linear compressor 100 and manufacturing cost may be easily reduced. In addition, since magnetic stiffness suitable for high-speed operation is ensured according to the design of the magnetoresistive air gap 135, an efficient operating condition may be easily designed even at a high speed. In case where the mechanical resonance spring is designed to increase stiffness, the mass of the spring itself is increased together to lower efficiency. The present disclosure is advantageous in that stiffness may be easily increased by the magnetoresistive air gap 135.

In the above, the structure in which the magnetic stiffness as the characteristics of the resonance spring is increased by forming the magnetoresistive air gap 135 in the stator 131 according to an embodiment of the present disclosure has been described. Hereinafter, a structure for more effectively increasing the stroke of the movable magnet 132a serving as a magnetic resonance spring according to another embodiment of the present disclosure will be described.

Figure 5:
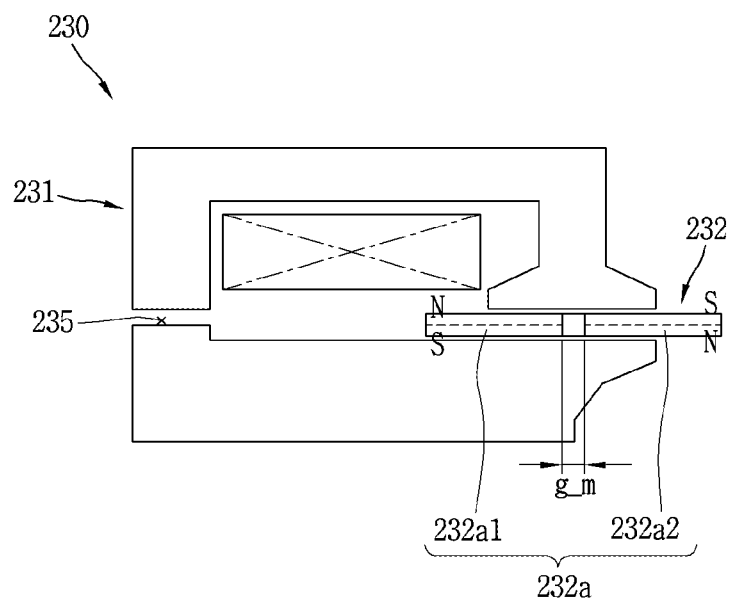
FIG. 5 is a conceptual view illustrating a driving unit of a linear compressor according to another embodiment of the present disclosure.

FIG. 5 is a conceptual view illustrating a driving unit 230 of the linear compressor 100 according to another embodiment of the present disclosure. A stator 231 of another embodiment of the present disclosure may include a magnetoresistive air gap 235 formed in the above-described embodiment. However, a movable magnet 232a of the present embodiment may be configured such that a first magnet 232a1 and a second magnet 232a2 are spaced apart from each other.

As in an embodiment of the present disclosure, the movable magnet 232a may have the first and second magnets 232a1 and 232a2, and the first and second magnets 232a1 and 232a2 may be disposed such that the N poles and S poles thereof are opposite to each other in the radial direction of the cylinder 141. In addition, the first and second magnets 232a1 and 232a2 of the present embodiment may be disposed so as to be spaced apart from each other in the axial direction of the cylinder 141.

The first and second magnets 232a1 and 232a2 of the present embodiment may be manufactured to be magnetized such that they are spaced apart from each other on the integrally formed mover 232. Alternatively, the first and second magnets 232a1 and 232a2 may be separately manufactured and magnetized and mounted on the mover 232 such that they are spaced apart from each other at a predetermined gap g_m.

Since the first and second magnets 232a1 and 232a2 are spaced apart from each other, the mover 232 according to another embodiment of the present disclosure may be increased in length in a reciprocating direction of the piston 142 as compared with the same size of the movable magnet 232a. When the movable magnet 232a disposed to be longer in the axial direction of the cylinder 141 interacts with the stator 231, a stroke in which the mover 232 and the piston 142 reciprocate in the axial direction of the cylinder 141 may be increased.

Figure 6A:
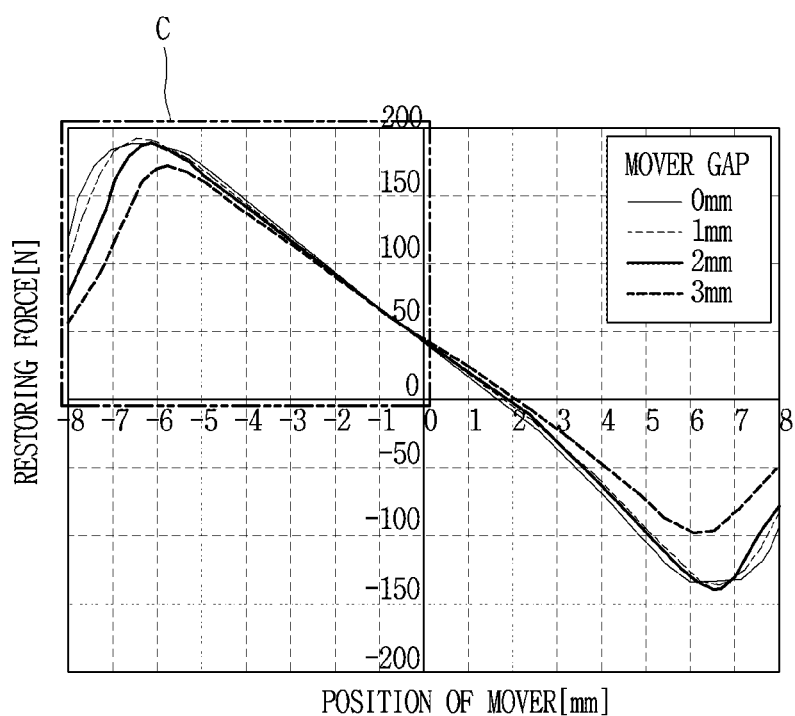
FIG. 6A is a graph illustrating a change in a restoring force according to distances between first and second magnets in FIG. 5.
Figure 6B:
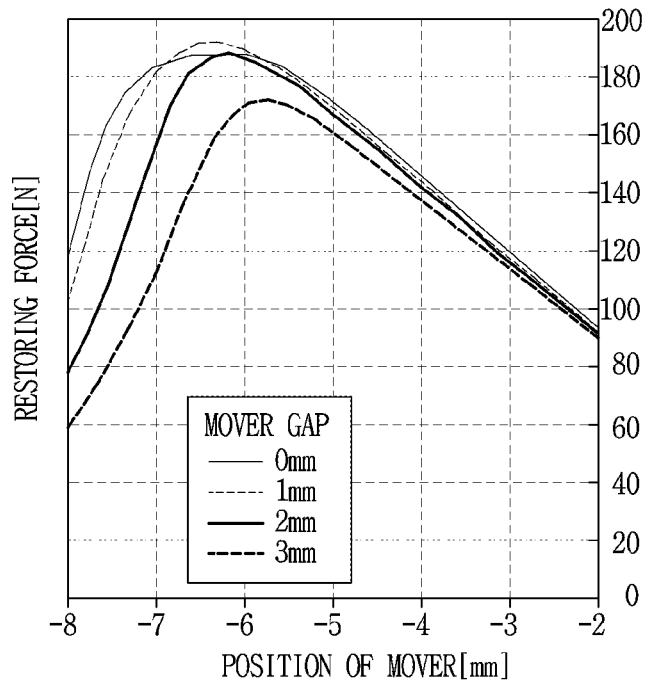
FIG. 6B is an enlarged view of a region 'C' illustrated in FIG. 6A.

FIG. 6A is a graph illustrating a change in a restoring force according to distances between the first and second magnets 232a1 and 232a2 in FIG. 5, and FIG. 6B is an enlarged view of a region 'C' illustrated in FIG. 6A. Referring to FIGS. 6A and 6B, it may be seen that as the mover gap g_m between the first and second magnets 232a1 and 232a2 increases, a section in which the restoring force is distributed close to a straight line is wider. In other words, as the mover gap g_m increases, inflection of the restoring force is more clearly formed and an operable stroke region may be enlarged.

As illustrated, as for the mover gap g_m, inflection of the restoring force is clearly formed in a section in which the size of the mover gap g_m is increased up to 2 mm. Specifically, referring to FIG. 6B, it may be seen that, as the inflection of the restoring force is clear, a maximum value of the restoring force is increased and a point having a maximum value is further away from the reference position O. In the present disclosure, since a point where the restoring force has a maximum value (or minimum value) may be designed as a bottom dead center (top dead center), there is an effect that the operable stroke area is enlarged.

However, it may be seen that, when the mover gap g_m is 3 mm, the magnitude of the restoring force and the operable stroke area are rapidly reduced. Therefore, the gap between the first magnet 232a1 and the second magnet 232a2 may be designed to be preferably larger than 0 and smaller than 2 mm. Alternatively, considering that the thickness of the first and second magnets 232a1 and 232a2 in the radial direction of the cylinder 141 as illustrated in FIGS. 6A and 6B is 2 mm, the mover gap g_m may have a value equal to or smaller than a thickness of the movable magnet 232a in the radial direction of the cylinder 141.

Further, in another embodiment of the present disclosure in which the first magnet 232a1 and the second magnet 232a2 are spaced apart from each other, the amount of the magnet may be reduced to reduce manufacturing cost, as compared with a case where a length of the first magnet 232a1 and the second magnet 232a2 is increased in a state in which the first magnet 232a1 and the second magnet 232a2 are connected to each other.

In the above, the structure in which the first and second magnets 232a1 and 232a2 constituting the movable magnet 232a forming the restoring force are separated from each other has been described. Hereinafter, additional structural characteristics for minutely and easily adjusting the characteristics of the magnetic resonance spring according to another embodiment of the present disclosure will be described.

Figure 7:
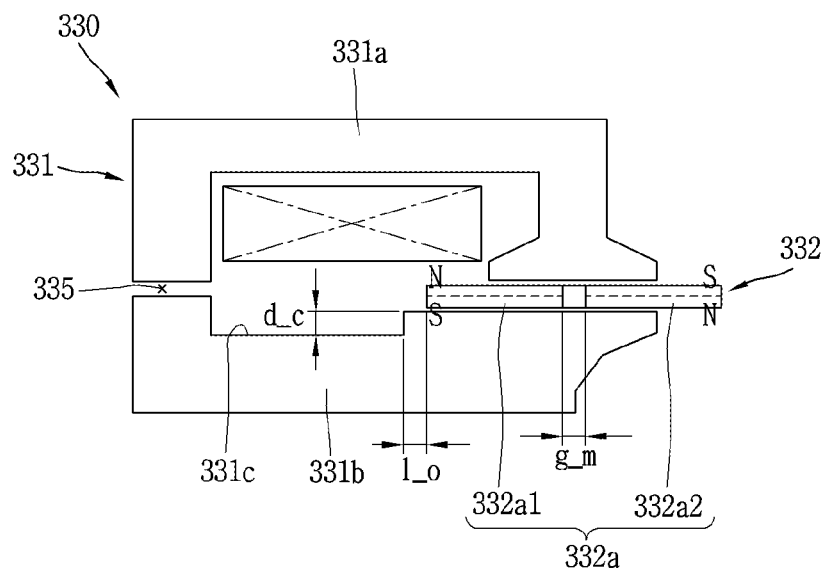
FIG. 7 is a conceptual view illustrating a driving unit of a linear compressor according to another embodiment of the present disclosure.

FIG. 7 is a conceptual view illustrating a driving unit 330 of the linear compressor 100 according to another embodiment of the present disclosure. This embodiment of the present disclosure is similar to the above-described embodiment of the present disclosure in that a magnetoresistive air gap 335 is formed in a stator 331 and a first magnet 332a1 and a second magnet 332a2 are spaced apart from each other.

However, in another embodiment of the present disclosure, an inner stator 331b may have a recess portion 331c. As illustrated in FIG. 7, the recess portion 331c may be formed on an outer surface of the inner stator 331b facing a winding coil 333.

The recess portion 331c may be formed to have a recessed depth (d_c) (or a 'core depth') and a distance (l_o) (or an 'over length') from the mover 332 at the reference position O to the recess portion 331c as design variables. As illustrated, the core depth d_c may be formed to have a value equal to or smaller than a thickness of the movable magnet 332a in the radial direction of the cylinder 141, or may be 2 mm or less. The over-length (l_o) in the axial direction of the cylinder 141 may be formed to have a value equal to or smaller than the thickness of the movable magnet 332a in the radial direction of the cylinder 141 or may be set to 2 mm or smaller.

Figure 8A:
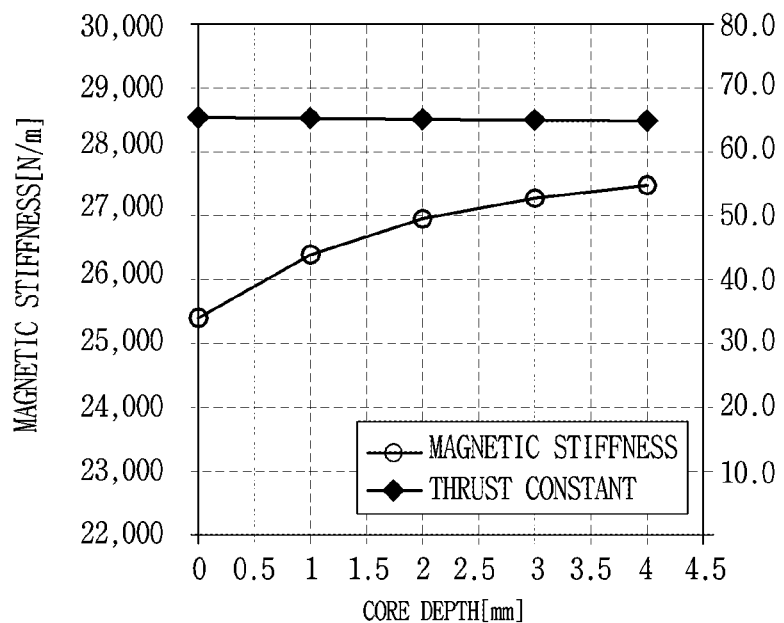
FIG. 8A is a graph illustrating a change in magnetic stiffness and thrust constant according to a core depth illustrated in FIG. 7.
Figure 8B:
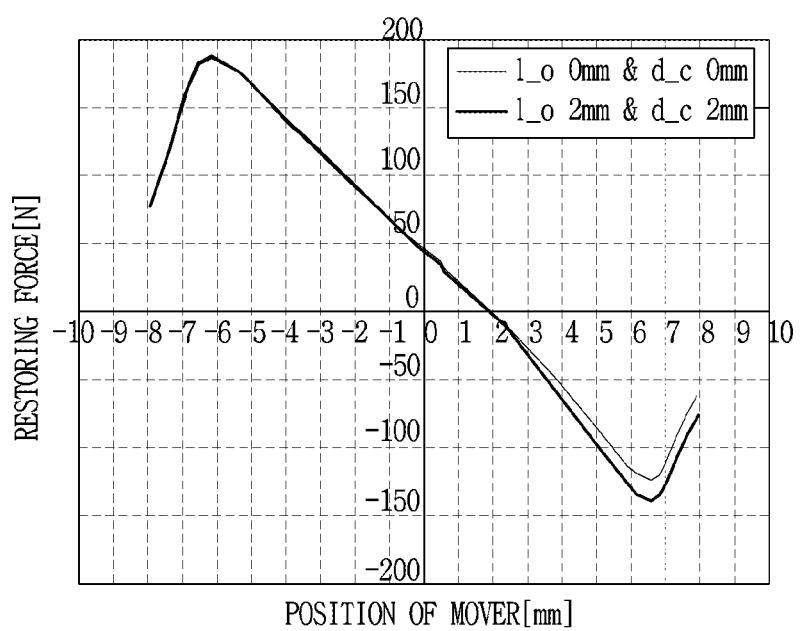
FIG. 8B is a graph illustrating a change in a restoring force according to shapes of a recess portion illustrated in FIG. 7.
Figure 8C:
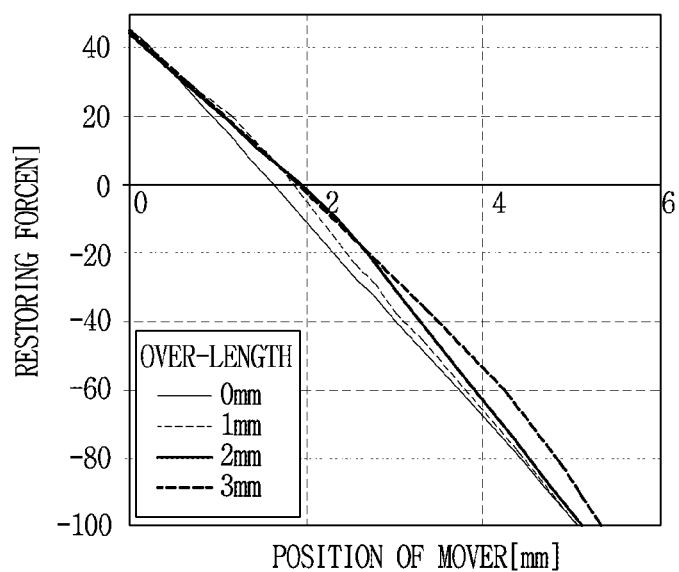
FIG. 8C is a graph illustrating a change in offset according to shapes of the recess portion illustrated in FIG. 7.

FIG. 8A is a graph illustrating a change in magnetic stiffness and thrust constant according to the core depth (d_c) illustrated in FIG. 7. FIG. 8B is a graph illustrating a change in a restoring force according to shapes of the recess portion 331c illustrated in FIG. 7. FIG. 8C is a graph illustrating a change in offset according to shapes of the recess portion 331c illustrated in FIG. 7.

First, as illustrated in FIG. 8A, the magnetic stiffness may be adjusted by changing the core depth d_c. Since the magnetic stiffness tends to increase as the core depth d_c increases, a magnetic resonance spring may be designed to be advantageous for a high-speed operation. In particular, as illustrated, since the thrust constant is rarely changed even when the core depth d_c changes, the core depth d_c may be utilized as an independent design variable for changing only the magnetic stiffness.

Next, referring to FIG. 8B, it may be seen that the restoring force characteristics in the top dead center direction may be changed according to a change in the over-length l_o. As illustrated, when the recess portion 331c in which the core depth d_c and the over-length l_o are each 2 mm (or the same size as the thickness of the movable magnet 332a) is provided, the restoring force characteristics may be improved.

Meanwhile, referring to FIG. 8C, it may be seen that the over-length l_o may change an offset value. The offset refers to the amount by which the point at which the restoring force is zero is pushed toward the top dead center, and the offset is appropriately designed to a level for overcoming pressure of the refrigerant compressed in the compression chamber P. As illustrated in FIG. 8C, since the offset tends to decrease as the over-length l_o is shorter, the offset value may be finely adjusted by the over-length l_o. Meanwhile, it may be seen from FIG. 8C that the offset tends not to increase although the over-length l_o exceeds 2 mm (or the same size as the thickness of the movable magnet 332a). Therefore, it is also possible to adjust the over-length l_o, without affecting the offset value in consideration of other design constraints.

As described above, the magnetic stiffness, the restoring force, and the offset value may be changed by the recess portion 331c provided in another embodiment of the present disclosure. In particular, the magnetic stiffness may be set independently of the thrust constant according to the core depth d_c, unlike the case where the magnetic stiffness and the thrust constant are dependently changed according to formation of the magnetoresistive air gap 335. Furthermore, by setting the core depth d_c and the over-length l_o to have the same value as the thickness of the movable magnet 332a, the magnitude of the restoring force in the direction of the top dead center may be increased.

Figure 9A:
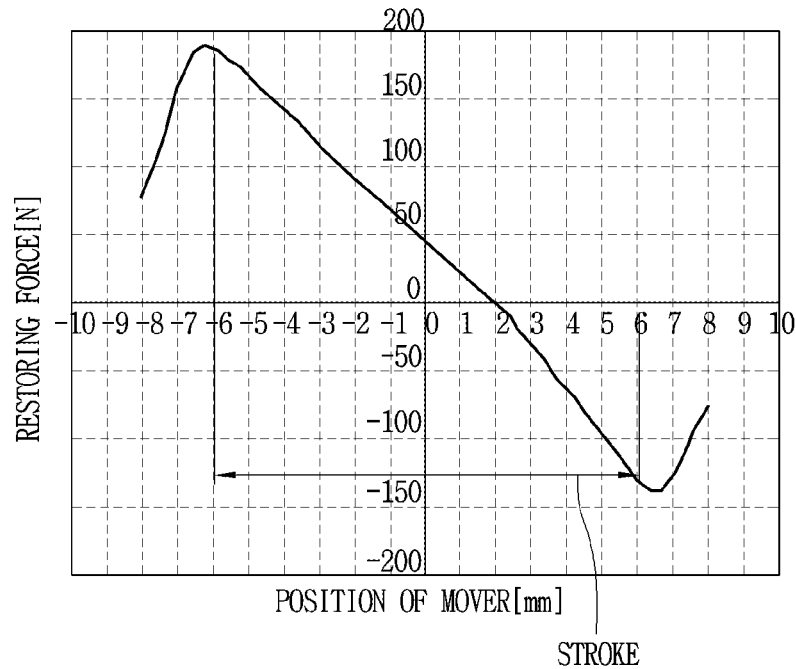
FIG. 9A is a graph illustrating a change in a restoring force of a linear compressor to which the driving unit illustrated in FIG. 7 is applied.
Figure 9B:
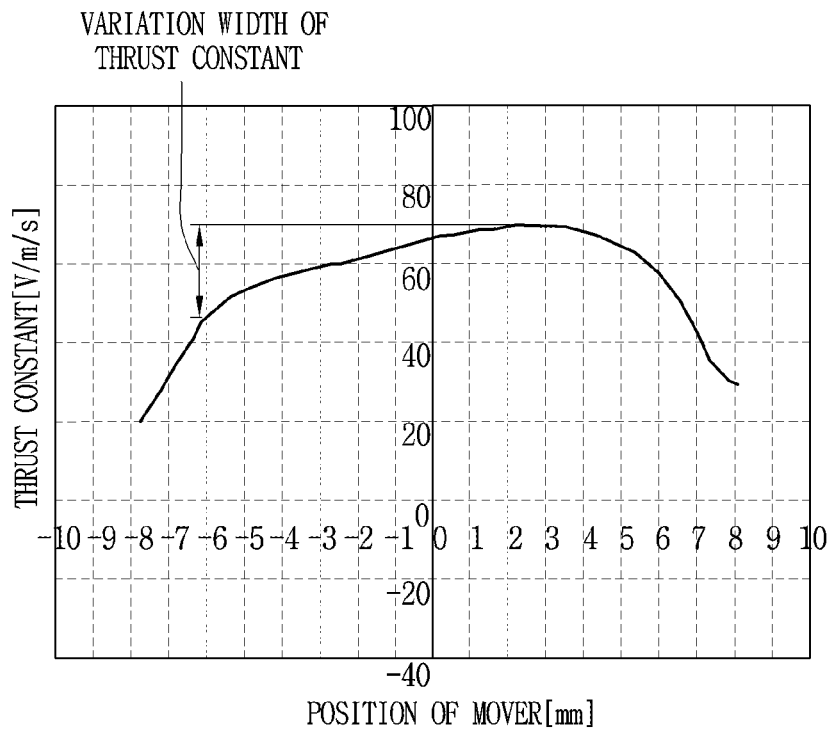
FIG. 9B is a graph illustrating a change in a thrust constant of a linear compressor to which the driving unit illustrated in FIG. 7 is applied.

FIG. 9A is a graph illustrating a change in a restoring force of the linear compressor 100 to which the driving unit 330 illustrated in FIG. 7 is applied, and FIG. 9B is a graph illustrating a change in a thrust constant of the linear compressor 100 to which the driving unit 330 illustrated in FIG. 7 is applied.

FIGS. 9A and 9B illustrate magnetic resonance spring characteristics of the linear compressor 100 to which the magnetoresistive gap g_s, the mover gap g_m, and the recess portion 331c are all applied. It is noted in FIGS. 9A and 9B that a fluctuation of the thrust constant is small in the operating stroke range and that the offset value may be ensured enough to overcome refrigerant pressure in the compression chamber.

First, the fact that a fluctuation of the thrust constant is small refers to that a magnetic flux flowing along the stator 331 and interlinking the coil is small in variation width according to positions of the movable magnet 332a. This feature refers to that operations such as stroke calculation and detection of an inflection point may be easily performed, and therefore, an operation of controlling the driving unit may be reliably performed without a sensor.

Further, since the offset value is sufficiently secured, the linear compressor 100 of the present disclosure may easily overcome a natural backward shift due to the refrigerant pressure in the compression chamber P. This means that the same movable magnet 332a may be operated to have a wider stroke, and therefore, there is an effect that cooling power of the compressor may be increased.

Figure 10:
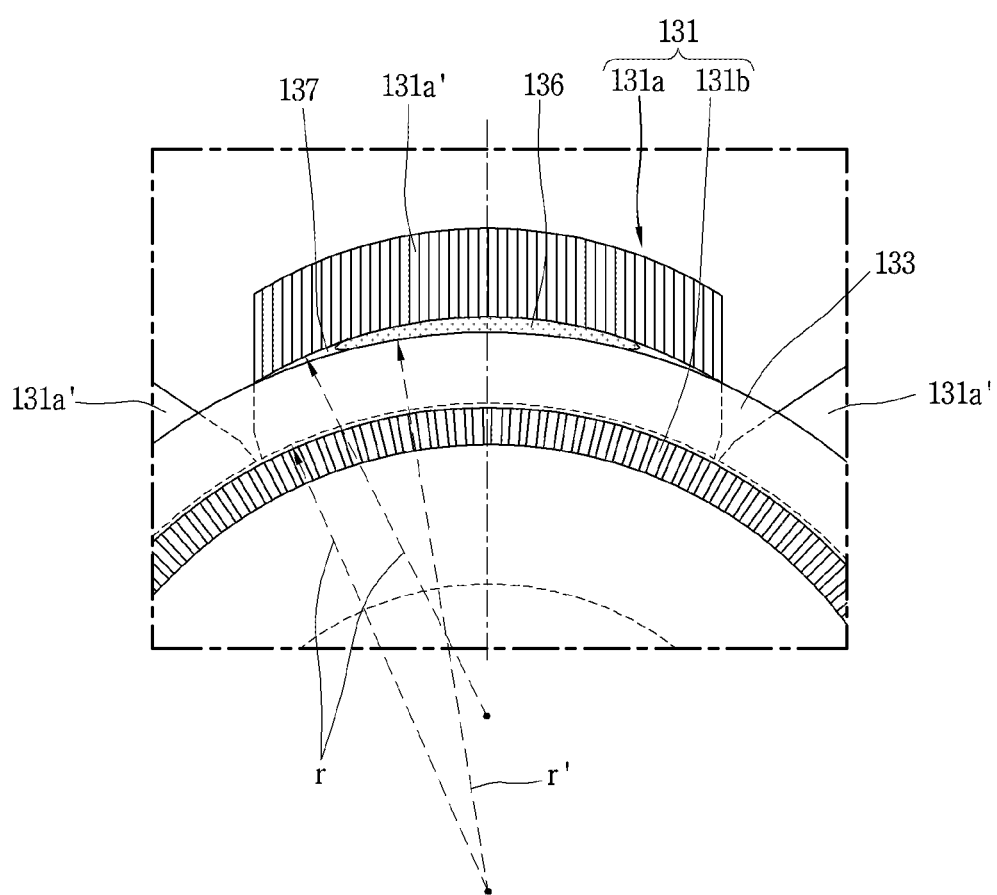
FIG. 10 is a cross-sectional view of the driving unit illustrated in FIG. 1, viewed in an axial direction of a cylinder.

Meanwhile, the linear compressor 100 according to the present disclosure, which is operated by the magnetic resonance spring described above, may further include a structure advantageous for heat dissipation to enhance heat efficiency. FIG. 10 is a cross-sectional view of the driving unit 130 illustrated in FIG. 1, viewed in the axial direction of the cylinder 141. Referring to FIG. 10, the driving unit 130 of the linear compressor 100 according to the present disclosure may further include a heat dissipating member 136.

As illustrated in FIGS. 1 and 10, the outer stator 131a of the stator 131 may be disposed to surround the inner stator 131b and accommodate the winding coil 133 extending in the circumferential direction of the cylinder 141. Here, the heat dissipating member 136 may be interposed between the outer stator 131a and the winding coil 133 and may be in contact with each of the outer stator 131a and the winding coil 133.

The heat dissipating member 136 may serve to promote conductive heat transfer from the winding coil 133 to the outer stator 131a side, that is, in the radial direction of the cylinder 141. As illustrated in FIG. 10, the outer stator 131a may be disposed to face the inner stator 131b with the winding coil 133 interposed therebetween and may include a plurality of block cores 131a' spaced from each other in the circumferential direction of the cylinder 141. Also, each of the block cores 131a' may be formed by stacking a plurality of sheets.

In the process of forming the block core 131a' by stacking a plurality of sheets, an inner circumferential surface of the block core 131a' has a radius of curvature (r) substantially equal to that of an outer circumferential surface of the inner stator 131b for the convenience of joining with the inner stator 131b. Also, an outer circumferential surface of the winding coil 133 housed inside the block core 131a' may form a radius of curvature (r') larger than the radius of curvature of the block core 131a'.

A core air gap 137 may be formed between a curved surface of the outer stator 131a (specifically, the block core 131a') facing the winding coil 133 and the outer circumferential surface of the winding coil 133 due to a difference in radius of curvature. Since the core air gap 137 may be filled with a gas having a relatively low thermal conductivity coefficient in the casing 110, the core air gap 137 may adversely affect heat dissipation from the winding coil 133 to the outer stator 131a side.

The stator 131 of the linear compressor 100 according to the present disclosure may include the heat dissipating member 136 in which the outer stator 131a and the winding coil 133 are connected to each other to fill the core air gap 137, and conductive heat transfer may be promoted through the heat dissipation member 136. The heat dissipating member 136 is advantageously formed of a material having high thermal conductivity. However, the heat dissipating member 136 may be formed of a clay material whose shape may be deformed by an external force until moisture contained in the heat dissipating member 136 is evaporated for drying so as to ensure ease of insertion and fixing of the heat dissipating member 136.

In the linear compressor 100 of the present disclosure, heat dissipation may be smoothly performed in the radial direction of the cylinder 141 as the heat dissipating member 136 is inserted into the core air gap 137. As a result, a temperature of the compression chamber P is kept lower than that in the related art case, reducing power required for compression to enhance efficiency of the compressor.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A linear compressor comprising:
    a casing;
    a cylinder that defines a compression chamber inside of the casing, the compression chamber being configured to receive a fluid;
    a piston configured to reciprocate relative to the cylinder and configured to compress the fluid in the compression chamber;
    a mover comprising a magnet configured to move relative to a reference position, the mover being configured to drive the piston based on a movement of the magnet in a reciprocating direction relative to the reference position; and
    a stator that is configured to, based on interaction with the magnet, generate a thrust force to cause movement of the mover in the reciprocating direction and a restoring force to cause movement of the mover toward the reference position,
    wherein the mover is configured to define a magnetic circuit along the stator,
    wherein the stator comprises an outer stator and an inner stator that faces the outer stator and that is spaced apart from the outer stator in a radial direction of the cylinder,
    wherein the outer stator and the inner stator define:
        a mover air gap between a first end of the outer stator and a first end of the inner stator, the mover air gap being configured to accommodate the magnet, and
        a magnetoresistive air gap that is spaced apart from the mover air gap in an axial direction of the cylinder and that is configured to allow a change of magnetic resistance of the magnetic circuit,
    wherein the magnetoresistive air gap is defined between a second end of the outer stator and a second end of the inner stator, the second end of the inner stator directly facing the second end of the outer stator and being spaced apart from the second end of the outer stator in the radial direction of the cylinder, and
    wherein the magnetoresistive air gap is smaller than the mover air gap and a thickness of the magnet in the radial direction of the cylinder such that the magnet is outside of the magnetoresistive air gap.

2. The linear compressor of claim 1, wherein the inner stator surrounds the cylinder, wherein the outer stator surrounds the inner stator and is configured to accommodate a winding coil that extends in a circumferential direction of the cylinder, and wherein the first end of the inner stator faces the first end of the outer stator and a first portion of the winding coil, the inner stator defining a recess portion that is recessed from the first end of the inner stator and that faces a second portion of the winding coil.

3. The linear compressor of claim 2, wherein a depth of the recess portion is less than or equal to the thickness of the magnet in the radial direction of the cylinder.

4. The linear compressor of claim 2, wherein a depth of the recess portion is 2 mm or less.

5. The linear compressor of claim 2, wherein a distance between the recess portion of the inner stator and the mover in the axial direction of the cylinder is less than the thickness of the magnet in the radial direction of the cylinder and based on the magnet being positioned at the reference position.

6. A linear compressor comprising:
a casing;
a cylinder that defines a compression chamber inside of the casing, the compression chamber being configured to receive a fluid;
a piston configured to reciprocate relative to the cylinder and configured to compress the fluid in the compression chamber;
a mover comprising a plurality of magnets that are spaced apart from each other by a magnet gap in an axial direction of the cylinder and that are configured to move in the axial direction relative to a reference position, the mover being configured to drive the piston based on a movement of the plurality of magnets in the axial direction relative to the reference position; and
a stator that is configured to, based on interaction with the plurality of magnets, generate a thrust force to cause movement of the mover in the axial direction and a restoring force to cause movement of the mover toward the reference position,
wherein the mover is configured to define a magnetic circuit along the stator,
wherein the stator comprises an outer stator and an inner stator that faces the outer stator and that is spaced apart from the outer stator in a radial direction of the cylinder,
wherein the outer stator and the inner stator define:
a mover air gap between a first end of the outer stator and a first end of the inner stator, the mover air gap being configured to accommodate the plurality of magnets and the magnet gap, and
a magnetoresistive air gap that is spaced apart from the mover air gap in the axial direction and that is configured to allow a change of magnetic resistance of the magnetic circuit, wherein the magnetoresistive air gap is defined between a second end of the outer stator and a second end of the inner stator, the second end of the inner stator directly facing the second end of the outer stator and being spaced apart from the second end of the outer stator in the radial direction of the cylinder, wherein the magnetoresistive air gap is smaller than the mover air gap and a thickness of the plurality of magnets in the radial direction of the cylinder such that the plurality of magnets are outside of the magnetoresistive air gap, wherein the plurality of magnets comprises:
a first magnet having a first N pole and a first S pole that are defined inside of the mover air gap, and
a second magnet spaced apart from an axial end of the first magnet by the magnet gap, the second magnet having a second N pole positioned opposite to the first N pole and a second S pole positioned opposite to the first S pole, and wherein a width of the magnet gap in the axial direction is less than or equal to a thickness of each of the first magnet and the second magnet in the radial direction of the cylinder.

7. The linear compressor of claim 6, wherein:
the inner stator surrounds the cylinder;
the outer stator surrounds the inner stator and is configured to accommodate a winding coil that extends in a circumferential direction of the cylinder; and
the inner stator defines a recess portion recessed from a surface that faces the winding coil.

8. The linear compressor of claim 7, wherein a depth of the recess portion is less than or equal to the thickness of the mover in the radial direction of the cylinder.

9. The linear compressor of claim 7, wherein a depth of the recess portion is 2 mm or less.

10. The linear compressor of claim 7, wherein a distance between the recess portion and the mover in the axial direction of the cylinder is less than the thickness of the mover in the radial direction of the cylinder.

11. The linear compressor of claim 6, wherein the mover air gap and the magnetoresistive air gap extend in the axial direction of the cylinder and are spaced apart from each other in the axial direction of the cylinder, and
wherein the inner stator defines a recess portion that is recessed in the radial direction of the cylinder and that extends in the axial direction of the cylinder between the mover air gap and the magnetoresistive air gap.

12. The linear compressor of claim 1, wherein the inner stator defines a recessed portion between the first and second ends of the inner stator, the recessed portion being recessed inward in the radial direction of the cylinder relative to the first and second ends of the inner stator.

* * * * *